United States Patent

Gutner

[15] 3,645,489
[45] Feb. 29, 1972

[54] MIRROR BRACKET
[72] Inventor: Kenneth H. Gutner, 1530 Old Skokie Road, Highland Park, Ill. 60035
[22] Filed: Apr. 9, 1970
[21] Appl. No.: 26,915

[52] U.S. Cl..........................248/480, 248/291, 287/20.924
[51] Int. Cl..........................................................A47g 1/24
[58] Field of Search.......248/480, 291; 287/20.924, 20.92 R; 16/159

[56] References Cited

UNITED STATES PATENTS 3,120,937  2/1964  Gutner...................................248/480
2,486,723  11/1949  Thompson.........................287/189-35
1,765,614  6/1930  Roberts........................287/20.92 C X
2,904,290  9/1959  Mullen....................................248/480

Primary Examiner—Chancellor E. Harris
Attorney—Dawson, Tilton, Fallon & Lungmus

[57] ABSTRACT

A mirror bracket made up of two elongated interconnected, pivotally related members, one for attachment to a mirror back and the other for attachment to a dresser back, the dresser element being equipped with novel transversely extending ribs which serve to both reinforce the dresser element while also creating a slight distortion in the dresser element to facilitate immobilization by gripping the dresser back.

1 Claims, 5 Drawing Figures

Patented Feb. 29, 1972
3,645,489
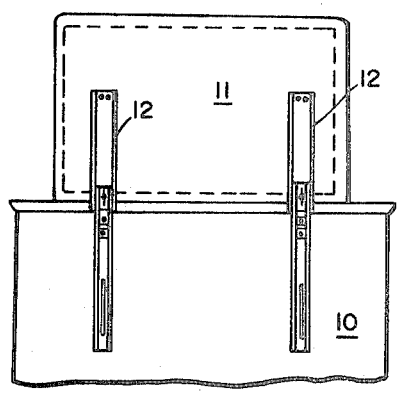
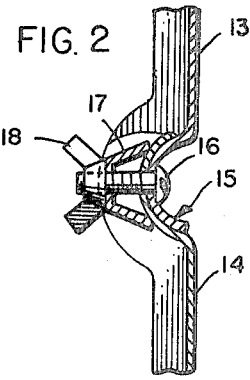
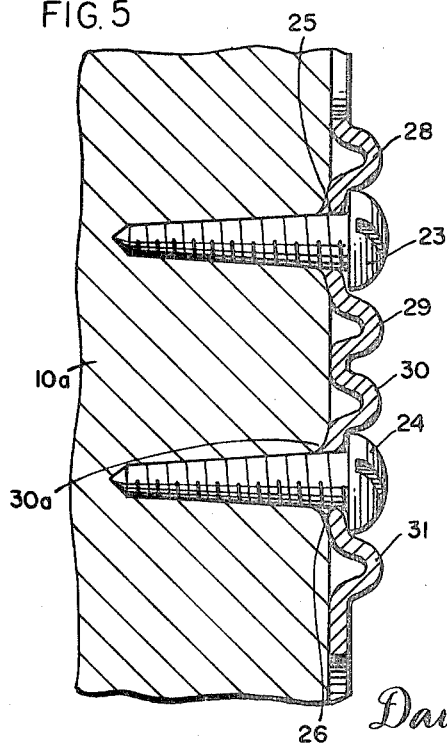
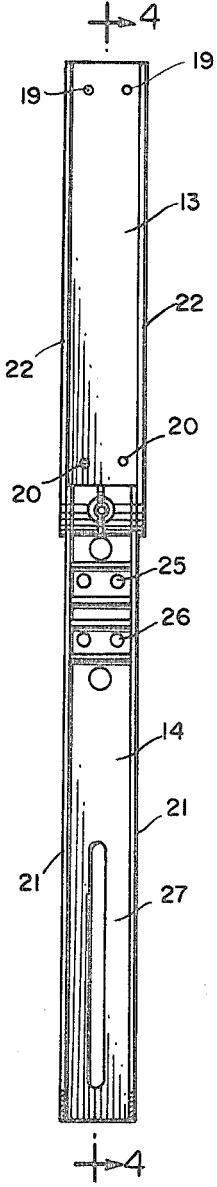
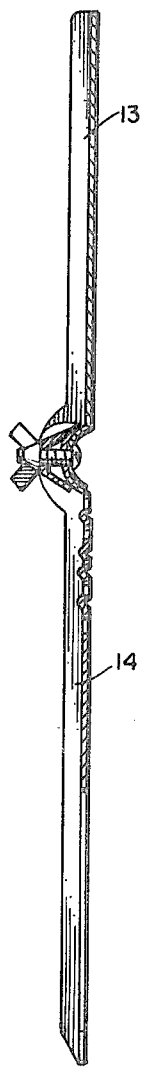
INVENTOR:
KENNETH H. GUTNER
BY
Dawson, Tilton, Fallon & Lungmus
ATT'YS

MIRROR BRACKET

BACKGROUND AND SUMMARY OF INVENTION

In the practice of the invention seen in my earlier U.S. Pat. No. 3,120,937, the mirror and dresser elements were channel-shaped and were nested in one fashion for shipment. Most advantageously, the dresser element was received within the mirror element, while the latter was secured to the rear of the mirror. Thus, an extraordinarily secure attachment could be achieved at the factory. It was up to the store owner or purchaser to reassemble to the elements, particularly mounting the dresser element against the dresser back. This was the point of maximum stress, and I have now discovered a novel means for achieving not only a stronger dresser element, but one which is more rigidly connectable to the dresser back.

In the illustrated embodiment of the invention, the dresser element is channel-shaped having sidewalls spaced laterally of a bight portion. The bight portion is equipped with screw openings extending therethrough, and flanking these openings are transversely extending ribs. The ribs serve not only to strengthen the dresser element at the critical points of securement to the dresser back, but also distort the dresser element slightly so as to bite into the wooden dresser back, and therefore achieve a strong securement.

The invention is described in conjunction with the accompanying drawing, in which:

FIG. 1 is a fragmentary rear elevational view of a mirror and dresser structure equipped with the inventive mirror bracket;

FIG. 2 is an enlarged longitudinal sectional view in fragmentary form of one method of pivotally interconnecting the mirror and dresser elements;

FIG. 3 is a rear elevational view of the assembled mirror and dresser elements;

FIG. 4 is a longitudinal sectional view taken along the line 4-4 of FIG. 3; and

FIG. 5 is an enlarged fragmentary sectional view showing that portion of the dresser element which is secured to the dresser back.

In the illustration given, and with particular reference to FIG. 1, the numeral 10 designates a dresser, while the numeral 11 designates a mirror which is positioned above the dresser. The elements 10 and 11 are pivotally interrelated by means of mirror brackets 12. Each mirror bracket includes a mirror element 13 (see FIGS. 3 and 4) and a dresser element 14. The pivotal interconnection as at 15 in FIG. 2 is seen to include arcuate portions of each of the elements 13 and 14 which are clamped together by means of a bolt 16, cap 17, and wing nut 18. Further details of this interconnection can be seen in my earlier patent.

The mirror element is secured in a fashion (not shown) by means of wood screws or the like inserted through openings 19 and 20. As mentioned above, prior to final installation, the dresser element 14 may be nested within the mirror element 13, each of these elements being generally channel-shaped in cross section. Thus, each includes outwardly extending sidewalls connected by an intermediate bight portion. The spacing between the sidewalls 21 of the dresser element 14 is less than the spacing between the side walls 22 of the mirror element 13. When it is time to install the dresser element 14 against a dresser back (as at 10a in FIG. 5), the elements are reoriented to the configuration shown in the drawing. Wood screws 23 and 24 are advantageously inserted through the openings 25 and/or 26 in the bight portion 27 of the dresser element 21.

The bight portion 27 is equipped with outwardly projecting (relative to the dresser back 10a), transversely extending ribs 28, 29, 30, and 31. These ribs flank the openings 25 and 26 so as to cause a slight distortion of the bight portion in the fashion shown in exaggerated form as at 30a in FIG. 5, causing the bight portion to literally "bite" into the wooden dresser back 10a and aid in the mounting engagement of the dresser element 21 relative to the dresser back 10a.

I claim:

1. An enlarged mirror bracket for supporting a mirror above a dresser comprising first and second elongated elements adapted to be pivotally interconnected adjacent one end, each of said elements being channel-shaped and having thereby sidewall and bight portions, one of said elements being adapted to have its bight portion mounted on a dresser back, said one element having at least two longitudinally spaced apart screw-receiving openings extending therethrough in its bight portion, a plurality of longitudinally spaced-apart transversely extending ribs in said one member bight portion upstanding into said channel shape with said ribs being disposed adjacent said openings to distort said bight portion into gripping engagement with said dresser additional to the engagement achieved by said screws while additionally reinforcing said one member against deflection.

* * * * *

PO-1050
(5/69)

UNITED STATES PATENT OFFICE
CERTIFICATE OF CORRECTION

Patent No. 3,645,489          Dated February 29, 1972

Inventor(s) Kenneth H. Gutner

It is certified that error appears in the above-identified patent and that said Letters Patent are hereby corrected as shown below:

Column 2, line 30 (claim 1, line 1), the word "enlarged"

should be -- elongated --.

Signed and sealed this 20th day of June 1972.

(SEAL)
Attest:

EDWARD M. FLETCHER, JR.          ROBERT GOTTSCHALK
Attesting Officer                 Commissioner of Patents